UNITED STATES PATENT OFFICE.

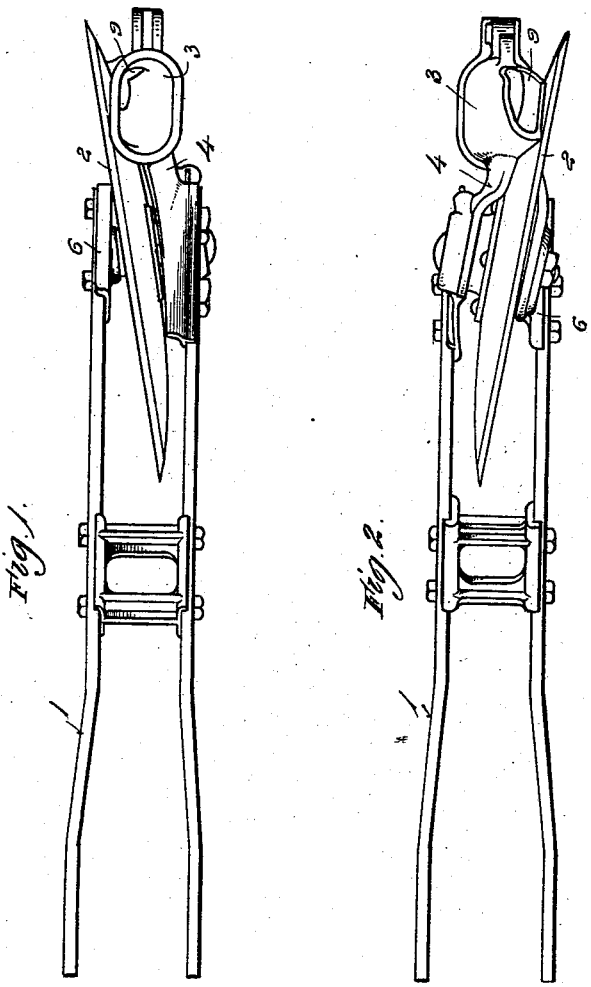

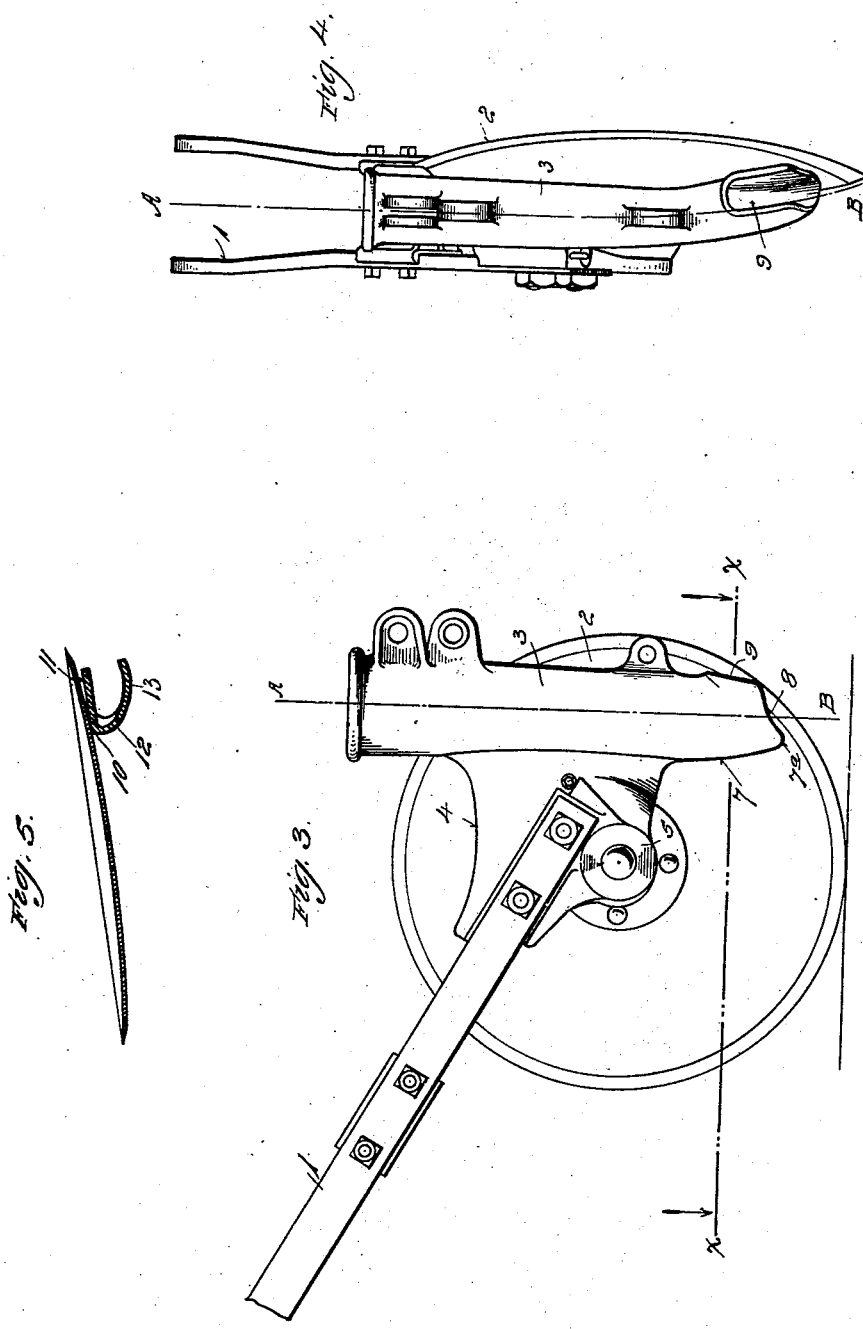

CHARLES H. PELTON, OF SPRINGFIELD, OHIO, ASSIGNOR TO THE THOMAS MANUFACTURING COMPANY, OF SPRINGFIELD, OHIO, A CORPORATION OF OHIO.

GRAIN-DRILL.

SPECIFICATION forming part of Letters Patent No. 714,025, dated November 18, 1902.

Application filed June 25, 1902. Serial No. 113,077. (No model.)

*To all whom it may concern:*

Be it known that I, CHARLES H. PELTON, a citizen of the United States, residing at Springfield, in the county of Clark and State of Ohio, have invented certain new and useful Improvements in Grain-Drills, of which the following is a specification, reference being had therein to the accompanying drawings.

This invention relates to grain-drills, and more particularly to a combined furrow-opening and seed-depositing device, and has for its object to provide a construction of this character wherein a furrow-opening disk is employed, the construction being such that the grain or grain and fertilizer will be positively and evenly deposited in the furrow without coming into contact with the disk, thus avoiding being scattered or carried around by the disk, and the construction being also such that clogging of the disk by adhesion of the soil or of the tube from the same cause or clogging of the flow of the materials passing through the tube may be avoided.

To these ends my invention consists in certain novel features which I will now proceed to describe and will then particularly point out in the claims.

In the accompanying drawings, Figure 1 is a plan view of a structure embodying my invention. Fig. 2 is an inverted plan view. Fig. 3 is a side elevation viewed from the land side. Fig. 4 is a rear elevation, and Fig. 5 is a plan section taken on the line *x x* of Fig. 3 and looking in the direction of the arrows.

In the said drawings, 1 indicates a drag-bar, which may be of the double form shown or of any other suitable form, by means of which drag-bar the furrow-opening disk 2 is supported. The disk is a concavo-convex disk set at an angle to the line of draft, with its concave face forward and its convex face to the rear, as is usual in furrow-opening disks. In connection with this furrow-opening disk I employ a seed-depositing tube 3, which is located near the rear edge of the furrow-opening disk, as shown, being maintained in a fixed relation relatively to said disk and being preferably supported by means of a forwardly-extending web or plate 4, to which the rear end of one arm of the drag-bar is bolted. This plate preferably carries the hub or trunnion 5, on which the disk 2 is mounted to rotate. Where a double drag-bar is employed, as in the construction shown, a casting 6 is used, to which the rear end of the other drag-bar arm is bolted and which in turn is bolted to the trunnion on which the disk revolves. These connections may, however, be of any suitable construction.

The seed-depositing tube 3 is of substantially the same width or diameter from front to rear from the top to the bottom thereof, except that the lower part of the front edge of said tube is constructed with a slight rearward and downward inclination, as indicated at 7. At the extreme lower part of the said front edge of the tube, which forms what may be termed the "nose" of the tube, it is rounded off, as indicated at 7ª, the curvature being downward and rearward, as clearly shown in Fig. 3. The tube is slightly flattened laterally, so that its transverse diameter is less than its longitudinal diameter, and this transverse diameter decreases but very slightly toward the bottom of the tube. The median axis of the tube, which is indicated by the dotted line A B, is straight and subtantially vertical when viewed from the side of the machine, as shown in Fig. 3, or, in other words, said median axis lies in a transverse plane which is preferably substantially vertical. Viewing the machine longitudinally, however, it will be observed that the median axis of the tube is curved or bent laterally as to the lower part of said edge, so as to have approximately the same curvature as the adjacent convex side of the disk in close proximity to which said tube is located. The interior passage of said tube, which receives the conducting-tube from the seed-feeding devices and through which passage the grain and fertilizer are carried to the furrow, has smooth continuous walls without any shoulders, inclines, or projections of any kind and without any material constrictions of its main or body portion, so that neither the grain nor the fertilizer will be arrested in their descent nor permitted to accumulate and clog the passage through the tube. Both of the side walls of the tube extend downward an equal distance, and the lower end of the tube is formed upon an upward inclination from front to rear. This inclination is preferably in the nature of an upward and rearward concave or reëntrant curve 8, the construction being such that the rear ends of the bottom edges of the side walls of the tube are considerably higher than the front ends thereof. From the point where these inclines or curves 8 terminate for a considerable distance upward the rear wall of the tube is cut away, as indicated at 9. The lower part of the tube is formed at its forward edge into an angle 10, which is produced by reason of the fact that the inner side of the tube or, in other words, that part of the body of the tube which is nearest to the disk is flat, presenting a plane surface externally, as indicated at 11. This part of the tube forms the inner edge of the angle 10, and the flattened wall of the tube lies against the disk at its extreme forward part, so as to be in slight or delicate contact therewith and act as a scraper to break up any particles of soil or mud adhering to the disk, thereby preventing the disk from becoming clogged or coated. The remainder of that portion of the side of the tube which is nearest the disk lies clear of or separated from the disk back of said forward edge, so as to form a clearance-space, the flat wall 11 diverging from the convex surface of the disk from its forward edge rearward, as clearly shown in Fig. 5. The other side or edge of the angle 10, formed by the front and outer sides or walls of the tube, diverges outwardly and rearwardly in a curve 12, which is approximately at a right angle to the wall 11, where it diverges from the same, said curve 12 merging into the flattened outer wall 13 of the tube, as clearly shown in Fig. 5. This outward and rearward divergence of the outer side of the tube serves to effectually prevent any clogging or accumulation of weeds, trash, stubble, or soil on the outer surface of the tube.

It will be observed that I have provided a seed-depositing tube which is substantially straight in side elevation, but which is bent or curved as to its lower portion when viewed from the front or rear of the machine, so as to have approximately the same curvature as the convex side of the disk, so that said tube is compact and occupies a minimum of space for its effective cross-sectional area. It will also be observed that the passage through this tube is without shoulders or constricted parts, so that the conducting-tube may move freely therein without binding, and the grain and fertilizer will pass freely through said depositing-tube without clogging. The downward and rearward inclination of the front edge of the lower portion of the tube indicated at 7 prevents the accumulation of trash or other objectionable material at the front thereof, and the structure of the side and front walls of the tube when considered in plan section is such as to keep the disk clear of mud and soil on the side thereof adjacent to the disk, while on the other or exposed sides it is such as to throw off and prevent the accumulation of trash. The two sides of the tube are carried down to an equal extent, so that the discharge or outlet end of the tube prevents the grain from being thrown against or coming into contact with the disk and insures its being deposited in the furrow. The avoidance of contact of the grain with the disk is desirable, for the reason that such contact often prevents equal distribution of the grain by reason of the deflection of the grain from its course by such contact, and it also prevents the grain from adhering to the disk in case the latter is wet or muddy, whereby it might be carried around and deposited, if at all, in undesirable places and in unequal quantities. The upward and rearward inclination of the lower end of the tube insures a discharge of the grain in a downward and rearward direction only, and this upward and rearward inclination of the discharge-opening also prevents clogging of the lower end of the tube by avoiding the accumulation of soil at said lower end. The rounding off of the nose of the tube further insures the avoidance of all clogging or picking up of trash and enables the tube to ride more easily over any substance with which it may come in contact. The cutting away of the rear wall of the tube above the lower end thereof further insures a rearward discharge of the grain and also further insures the avoidance of the clogging of the tube by accumulations of soil, since said cutting away or omission of the rear wall provides a large opening, which forms a clearance through which the soil may pass out during the forward motion of the machine. The tube is shown as provided with the usual lugs for the attachment of press-wheels, covering-chains, and a scraper.

I do not wish to be understood as limiting myself to the precise details of construction hereinbefore described, and shown in the accompanying drawings, as it is obvious that these details may be modified without departing from the principles of my invention.

Having thus fully described my invention, what I claim as new, and desire to secure by Letters Patent, is—

1. In a grain-drill, the combination, with a revolving concavo-convex furrow-opening disk set at an angle to the line of draft, of a depositing-tube in fixed relation to said disk, located back of the convex side and near the rear edge thereof, the lower portion of said tube having its front edge inclined slightly rearward and downward, its lower end inclined rearward and upward, and its nose rounded off from front to rear, substantially as described.

2. In a grain-drill, the combination, with a revolving concavo-convex furrow-opening disk set at an angle to the line of draft, of a depositing-tube in fixed relation to said disk, located back of the convex side and near the rear edge thereof, the lower portion of said tube having its wall adjacent to the disk flattened or straight in horizontal cross-section and lying against the disk at its forward edge, said side of the tube rearward of said edge diverging from the disk so as to form a clearance-space, substantially as described.

3. In a grain-drill, the combination, with a revolving concavo-convex furrow-opening disk set at an angle to the line of draft, of a depositing-tube in fixed relation to said disk, located back of the convex side and near the rear edge thereof, the lower end of said tube being formed with an upward and rearward inclination, and the back wall of said tube above said lower end being cut away to form a clearance-opening, substantially as described.

4. In a grain-drill, the combination, with a revolving concavo-convex furrow-opening disk set at an angle to the line of draft, of a depositing-tube in fixed relation to said disk, located back of the convex side and near the rear edge thereof, the lower portion of said tube having its front edge inclined slightly rearward and downward, its lower end inclined rearward and upward, and its nose rounded off from front to rear, said lower portion of the tube having its wall adjacent to the disk flattened or straight in horizontal section and lying against the side at its forward edge, said side of the tube rearward of said edge diverging from the disk so as to form a clearance-space between the two, substantially as described.

5. In a grain-drill, the combination, with a revolving concavo-convex furrow-opening disk set at an angle to the line of draft, of a depositing-tube in fixed relation to said disk, located back of the convex side and near the rear edge thereof, the lower portion of said tube having its front edge inclined slightly rearward and downward, its lower end inclined rearward and upward, its nose rounded off from front to rear, and its back wall cut away above the lower end to form a clearance-opening, substantially as described.

6. In a grain-drill, the combination, with a revolving concavo-convex furrow-opening disk set at an angle to the line of draft, of a depositing-tube in fixed relation to said disk, located back of the convex side and near the rear edge thereof, the lower portion of said tube having its front edge inclined slightly rearward and downward, its lower end inclined rearward and upward, its nose rounded off from front to rear, and its back wall above said lower end cut away to form a clearance-opening, said lower portion of said tube having its wall adjacent to the disk flattened or straight in horizontal cross-section and lying against the disk at its forward edge, said side of the tube rearward of said edge diverging from the disk so as to form a clearance-space between the disk and tube, the remainder of the wall of the lower portion of the tube curving outward and rearward from its junction with said flattened or straight portion, substantially as described.

7. In a grain-drill, the combination with a revolving concavo-convex furrow-opening disk set at an angle to the line of draft, of a laterally-flattened depositing-tube in fixed relation to said disk, located back of the convex side and near the rear edge thereof, said tube being of substantially equal width throughout its length from front to rear, except for a slight rearward and downward inclination of the lower part of the front edge, the median axis of said tube being substantially straight and vertical when viewed from the side, or lying in a plane transverse to the line of draft, the lower part of the median axis of said tube being bent or curved laterally to approximately the same curvature as the adjacent convex side of the disk, said tube having an interior passage without inward projections or shoulders and without constrictions of the main part or body of said passage, and having an exclusively downward and rearward discharge-outlet at its lower end, said lower end being formed for that purpose with an upward and rearward inclination, and the nose of the tube being rounded off from front to rear, substantially as described.

8. In a grain-drill, the combination, with a revolving concavo-convex furrow-opening disk set at an angle to the line of draft, of a laterally-flattened depositing-tube in fixed relation to said disk, located back of the convex side and near the rear edge thereof, said tube being of substantially equal width throughout its length from front to rear, except for a slight rearward and downward inclination of the lower part of the front edge, the median axis of said tube being substantially straight and vertical when viewed from the side, or lying in a plane transverse to the line of draft, the lower part of the median axis of said tube being bent or curved laterally to approximately the same curvature as the adjacent convex side of the disk, said tube having an interior passage without inward projections or shoulders and without constrictions of the main part or body of said passage, and having an exclusively downward and rearward discharge-outlet at its lower end, the lower portion of said tube having its wall adjacent to the disk flattened or straight in horizontal cross-section and lying against the disk at its forward edge, said side of the tube rearward of said edge diverging from the disk, so as to form a clearance-space, substantially as described.

9. In a grain-drill, the combination, with a revolving concavo-convex furrow-opening disk set at an angle to the line of draft, of a laterally-flattened depositing-tube in fixed relation with said disk, located back of the convex side and near the rear edge thereof, said tube being of substantially equal width throughout its length from front to rear, except for a slight rearward and downward inclination of the lower part of the front edge, the median axis of said tube being substantially straight and vertical when viewed from the side, or lying in a plane transverse to the line of draft, the lower part of the median axis of said tube being bent or curved laterally to approximately the same curvature as the adjacent convex side of the disk, said tube having an interior passage without inward projections or shoulders and without constrictions of the main part or body of said passage, and having an exclusively downward and rearward discharge-outlet at its lower end, the lower end of said tube being formed for that purpose with an upward and rearward inclination, and the back wall of said tube above said lower end being cut away to form a clearance-opening, substantially as described.

10. In a grain-drill, the combination, with a revolving concavo-convex furrow-opening disk set at an angle to the line of draft, of a laterally-flattened depositing-tube in fixed relation to said disk, located back of the convex side and near the rear edge thereof, said tube being of substantially equal width throughout its length from front to rear, except for a slight rearward and downward inclination of the lower part of the front edge, the median axis of said tube being substantially straight and vertical when viewed from the side, or lying in a plane transverse to the line of draft, the lower part of the median axis of said tube being bent or curved laterally to approximately the same curvature as the adjacent convex side of the disk, said tube having an interior passage without inward projections or shoulders and without constrictions of the main part or body of said passage, and having an exclusively downward and rearward discharge-outlet at its lower end, said lower end being inclined rearward and upward for said purpose, the nose of the tube being rounded off from front to rear, and the lower portion of the tube having its wall adjacent to the disk flattened or straight in horizontal cross-section and lying against the disk at its forward edge, said side of the tube rearward of said forward edge diverging from the disk, so as to form a clearance-space between the two, substantially as described.

11. In a grain-drill, the combination, with a revolving concavo-convex furrow-opening disk set at an angle to the line of draft, of a laterally-flattened depositing-tube in fixed relation to said disk, located back of the convex side and near the rear edge thereof, said tube being of substantially equal width throughout its length from front to rear, except for a slight rearward and downward inclination of the lower part of the front edge, the median axis of said tube being substantially straight and vertical when viewed from the side, or lying in a plane transverse to the line of draft, the lower part of the median axis of said tube being bent or curved laterally to approximately the same curvature as the adjacent convex side of the disk, said tube having an interior passage without inward projections or shoulders and without constrictions of the main part or body of said passage, and having an exclusively downward and rearward discharge-outlet at its lower end, said lower end being inclined rearward and upward for said purpose, the nose of the tube being rounded off from front to rear, and the back wall of the tube being cut away above the lower end to form a clearance-opening, substantially as described.

12. In a grain-drill, the combination, with a revolving concavo-convex furrow-opening disk set at an angle to the line of draft, of a laterally-flattened depositing-tube in fixed relation to said disk, located back of the convex side and near the rear edge thereof, said tube being of substantially equal width throughout its length from front to rear, except for a slight rearward and downward inclination of the lower part of the front edge, the median axis of said tube being substantially straight and vertical when viewed from the side, or lying in a plane transverse to the line of draft, the lower part of the median axis of said tube being bent or curved laterally to approximately the same curvature as the adjacent convex side of the disk, said tube having an interior passage without inward projections or shoulders and without constrictions of the main part or body of said passage, and having an exclusively downward and rearward discharge-outlet at its lower end, said lower end being inclined rearward and upward for that purpose, the nose of the tube being rounded off from front to rear, and the back wall of the tube above said lower end being cut away to form a clearance-opening, said lower portion of said tube having its wall adjacent to the disk flattened or straight in horizontal cross-section and lying against the disk at its forward edge, said side of the tube rearward of said forward edge diverging from the disk, so as to form a clearance-space between the disk and tube, the remainder of the wall of the lower portion of the tube curving outward and rearward from its junction with said flattened or straight portion, substantially as described.

In testimony whereof I affix my signature in presence of two witnesses.

CHARLES H. PELTON.

Witnesses:
E. O. HAGAN,
IRVINE MILLER.